(12) United States Patent
Nishide et al.

(10) Patent No.: US 11,466,762 B2
(45) Date of Patent: Oct. 11, 2022

(54) BALL SCREW DEVICE

(71) Applicant: THK CO., LTD., Tokyo (JP)

(72) Inventors: Tetsuhiro Nishide, Tokyo (JP); Sho Iwashiro, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 17/267,108

(22) PCT Filed: Oct. 2, 2019

(86) PCT No.: PCT/JP2019/038901
§ 371 (c)(1),
(2) Date: Feb. 9, 2021

(87) PCT Pub. No.: WO2020/080106
PCT Pub. Date: Apr. 23, 2020

(65) Prior Publication Data
US 2021/0164548 A1 Jun. 3, 2021

(30) Foreign Application Priority Data
Oct. 19, 2018 (JP) .............................. JP2018-197357

(51) Int. Cl.
*F16H 25/22* (2006.01)
(52) U.S. Cl.
CPC ................. *F16H 25/2214* (2013.01)
(58) Field of Classification Search
CPC ............. F16H 25/2223; F16H 25/2214; F16H 2025/2481; F16H 25/2006
See application file for complete search history.

(56) References Cited

U.S. PATENT DOCUMENTS 4,148,226 A * 4/1979 Benton ............... F16H 25/2219
74/424.87
5,012,687 A * 5/1991 Hoshide ............. F16H 25/2214
74/89.36

(Continued)

FOREIGN PATENT DOCUMENTS

EP      1 500 572 A2    1/2005
JP      6-257657 A      9/1994
(Continued)

OTHER PUBLICATIONS

International Search Report dated Dec. 10, 2019, issued in counterpart International Application No. PCT/JP2019/038901 (1 page).

*Primary Examiner* — Jake Cook
*Assistant Examiner* — Gregory Robert Weber
(74) *Attorney, Agent, or Firm* — WHDA, LLP

(57) ABSTRACT

Provided is a ball screw device which enables easy production and assembly of a nut member and formation of an endless circulation path for balls in the nut member with high accuracy. The nut member includes a plurality of nut components arranged in a superposed manner along an axial direction of a screw shaft. At a boundary portion between the nut components which are adjacent to each other, a raceway path for balls extending around a periphery of the screw shaft is formed. A joining surface of each of the nut components used for joining with another one of the nut components includes: a raceway forming surface which is annularly formed around the through hole; and an abutment surface for joining which is formed on an outer side in a radial direction with respect to the raceway forming surface.

3 Claims, 4 Drawing Sheets

(56) References Cited

U.S. PATENT DOCUMENTS

| | | | |
|---|---|---|---|
| 5,988,007 A * | 11/1999 | Nishimura | F16H 25/2219 |
| | | | 74/424.87 |
| 7,017,437 B1 | 3/2006 | Zernickel et al. | |
| 7,350,434 B2 * | 4/2008 | Nishimura | F16C 33/3706 |
| | | | 74/424.82 |
| 8,196,486 B2 * | 6/2012 | Harada | F16H 25/2223 |
| | | | 74/424.81 |
| 10,441,764 B2 | 10/2019 | Akridge et al. | |
| 2008/0250887 A1 * | 10/2008 | Harada | F16H 25/2223 |
| | | | 74/424.82 |
| 2017/0211687 A1 * | 7/2017 | Furusawa | F16H 25/24 |
| 2018/0251150 A1 * | 9/2018 | Ognibene | B62D 5/0448 |

FOREIGN PATENT DOCUMENTS

| | | | |
|---|---|---|---|
| JP | H06-257657 A * | 9/1994 | |
| JP | 2003-524121 A | 8/2003 | |
| JP | 2018-96539 A | 6/2018 | |
| JP | 2018096539 A * | 6/2018 | |
| WO | 2007/029716 A1 | 3/2007 | |

\* cited by examiner

BALL SCREW DEVICE

TECHNICAL FIELD

The present invention relates to a ball screw device, which is capable of mutually converting a rotary motion and a translational motion.

BACKGROUND ART

A ball screw device is a mechanical element capable of mutually converting a rotary motion and a translational motion and is often used for the purpose of converting a rotary motion generated by a servomotor into a translational motion, for example, in various working machines, conveyance apparatus, and industrial robots. In the ball screw device, a screw shaft and a nut member having a substantially cylindrical shape are threadedly engaged with each other through intermediation of a plurality of balls. The ball screw device has such a configuration that, for example, rotation of the screw shaft causes the nut member to move in an axial direction of the screw shaft in accordance with a rotation amount of the screw shaft.

A spiral load path is formed between the screw shaft and the nut member. The balls are arranged in the load path and are configured to bear a load between the screw shaft and the nut member. Moreover, the nut member has a ball return path in which the balls roll in a no-load state. The ball return path connects both ends of the load path to allow the balls to circulate from one end to another end of the load path. That is, the load path and the ball return path form an endless circulation path for the balls.

Hitherto, various kinds of ball screw devices are publicly known. In Patent Literature 1, there is disclosed a ball screw device in which the endless circulation path for the balls is provided for only one turn around the screw shaft. In this ball screw device, a pair of insertion rings is provided inside a cylindrical nut member which is formed of a metal plate (FIG. 6 of Patent Literature 1). The insertion rings each have a rolling groove for balls that is formed by plastic working. The pair of insertion rings is combined to obtain the endless circulation path for the balls.

The pair of insertion rings is received in a hollow portion of the nut member, and is fixed inside the hollow portion by bending edge portions of the nut member. Moreover, annular spring elements are arranged between the edge portions of the nut member and the insertion rings, thereby being capable of pressing the insertion rings to apply a preload to the balls that roll in the rolling groove (see FIG. 9 of Patent Literature 1).

CITATION LIST

Patent Literature

[PTL1] JP 2003-524121 A

DISCLOSURE OF THE INVENTION

Problems to be Solved by Invention

In the ball screw device as described in Patent Literature 1, the pair of insertion rings is fixed to the hollow portion of the nut member by bending the edge portions of the nut member. Thus, it takes time and effort to assemble the nut member, and in addition, there is difficulty in improving positioning accuracy of the pair of insertion rings. Moreover, it is difficult to improve the positioning accuracy of the pair of insertion rings, and hence the endless circulation path for the balls cannot be formed with high accuracy. As a result, there arises a problem in that it is difficult to improve moving accuracy of the nut member relative to the screw shaft.

Means for Solving the Problems

The present invention has been made in view of the above-mentioned problems, and has an object to provide a ball screw device which enables easy production and assembly of a nut member, formation of an endless circulation path for balls in the nut member with high accuracy, and an increase in the number of circuits of the endless circulation path in an easy manner.

That is, according to the present invention, there is provided a ball screw device including: a plurality of balls; a screw shaft having a spiral rolling groove in an outer peripheral surface thereof, the spiral rolling groove being configured to allow the plurality of balls to roll therein; and a nut member which is threadedly engaged with the screw shaft through intermediation of the plurality of balls. The nut member includes a plurality of nut components each having a through hole in which the screw shaft is inserted, and which are arranged in a superposed manner along an axial direction of the screw shaft. At a boundary portion between the plurality of nut components which are adjacent to each other, a raceway path extending around a periphery of the screw shaft is formed as an endless circulation path for the plurality of balls. The plurality of nut components each have a joining surface used for joining with another one of the plurality of nut components, the joining surfaces each including: a raceway forming surface which is annularly formed around the through hole; and an abutment surface for joining which is formed on an outer side in a radial direction with respect to the raceway forming surface. Further, the raceway forming surface has a curved-surface shape along the raceway path, and the abutment surface for joining is formed as a flat surface perpendicular to the axial direction of the screw shaft. The raceway forming surfaces are formed so as to have the same shape on all of the plurality of nut components.

Effects of the Invention

According to the present invention, the nut components each have the raceway forming surface of the same shape, and hence the nut components can easily be produced by plastic working such as forging with dies. Moreover, the raceway forming surfaces of the same shape are superposed on each other without any gap, thereby being capable of forming the endless circulation path for the balls in the nut member with high accuracy. Further, with use of the abutment surface for joining formed on the outer side of the raceway forming surface, the nut member formed of the plurality of nut components can easily be assembled. Still further, the number of circuits of the endless circulation path for the balls formed in the nut member can easily be increased by increasing the number of nut components to be superposed.

MODE FOR CARRYING OUT THE INVENTION

Now, a detailed description is made of a ball screw device according to the present invention with reference to accompanying drawings.

Figure 1:
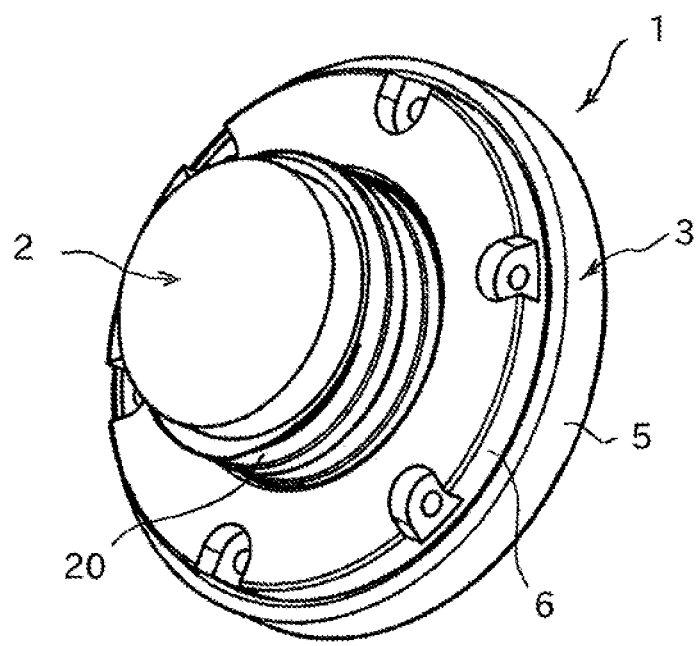
FIG. 1 is a perspective view for illustrating an example of a ball screw device to which the present invention is applied.

FIG. 1 shows an example of a ball screw device to which the present invention is applied.

The ball screw device 1 includes a screw shaft 2 and a cylindrical nut member 3. The screw shaft 2 has a rolling groove 20 for balls formed in a spiral shape in an outer peripheral surface of the screw shaft 2. The nut member 3 is threadedly engaged with a periphery of the screw shaft 2 through intermediation of a large number of balls. Moreover, the nut member 3 includes an endless circulation path for the balls extending around the periphery of the screw shaft. The balls are interposed between the screw shaft 2 and the nut member 3 under a state in which the balls are arranged in the endless circulation path. For example, the nut member 3 moves in an axial direction of the screw shaft 2 through rotation of the screw shaft 2 relative to the nut member 3, or the screw shaft 2 moves in an axial direction of the nut member 3 through rotation of the nut member 3 relative to the screw shaft 2.

Figure 2:
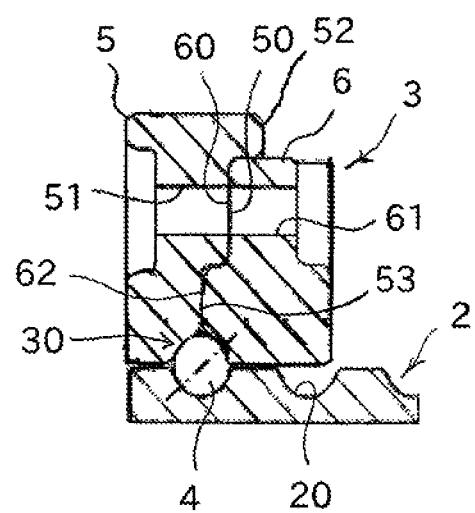
FIG. 2 is an enlarged sectional view for illustrating a state of engagement between a screw shaft and a nut member.

FIG. 2 is an enlarged sectional view for illustrating the nut member 3 and the screw shaft 2 taken along the axial direction, and is an illustration of a relationship among the screw shaft 2, balls 4, and the nut member 3. The nut member 3 has a cylindrical shape with a through hole configured to allow the screw shaft 2 to be inserted therethrough. A raceway path 30 for the balls 4 is formed in an inner peripheral surface of the through hole. The raceway path 30 is formed as a closed loop extending around the periphery of the screw shaft 2, and forms the endless circulation path for the balls 4 together with the rolling groove 20 of the screw shaft 2.

The nut member 3 is formed of a combination of a pair of nut components 5 and 6 each having a cylindrical shape, and the screw shaft 2 is inserted through a through hole of each of the nut components 5 and 6. In the following description, the nut component 5 is referred to as a first member, and the nut component 6 is referred to as a second member. The raceway path 30 is located at a boundary portion between the first member 5 and the second member 6, that is, at joining surfaces between the first member 5 and the second member 6. The raceway path 30 is obtained when the first member 5 and the second member 6 are combined with each other.

Figure 3:
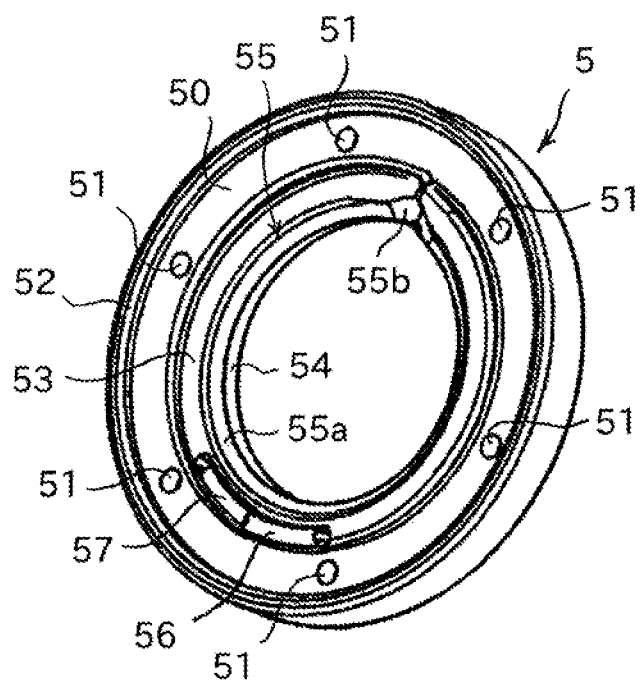
FIG. 3 is a perspective view for illustrating a first member forming the nut member.

FIG. 3 is a perspective view for illustrating the first member 5, and is an illustration of the first member 5 as viewed from the side of the joining surface with respect to the second member 6. The first member 5 has an annular abutment surface 50 for joining configured to fix the second member 6 thereat. A plurality of insertion holes 51 configured to allow fixing bolts to pass therethrough are formed in the abutment surface 50. Moreover, a rib 52 configured to surround an outer peripheral surface of the second member 6 is formed on a radially outer side of the abutment surface 50 for joining. A raceway forming surface 53 is formed on a radially inner side of the abutment surface 50 for joining. The raceway forming surface 53 is located between the abutment surface 50 for joining and an inner peripheral surface 54 of the through hole. That is, the raceway forming surface 53 is annularly formed around the through hole, and the abutment surface 50 for joining is formed on an outer side in a radial direction with respect to the raceway forming surface 53.

At a corner portion at which the raceway forming surface 53 and the inner peripheral surface 54 of the through hole intersect each other, a first ball circulation groove 55 forming the raceway path 30 is formed. The first ball circulation groove 55 includes a load groove portion 55a and a no-load groove portion 55b. The load groove portion 55a has a spiral shape having the same pitch as that of the rolling groove 20 of the screw shaft 2. The no-load groove portion 55b connects both ends of the load groove portion 55a to allow the balls to circulate between the both ends of the load groove portion 55a.

Figure 4:
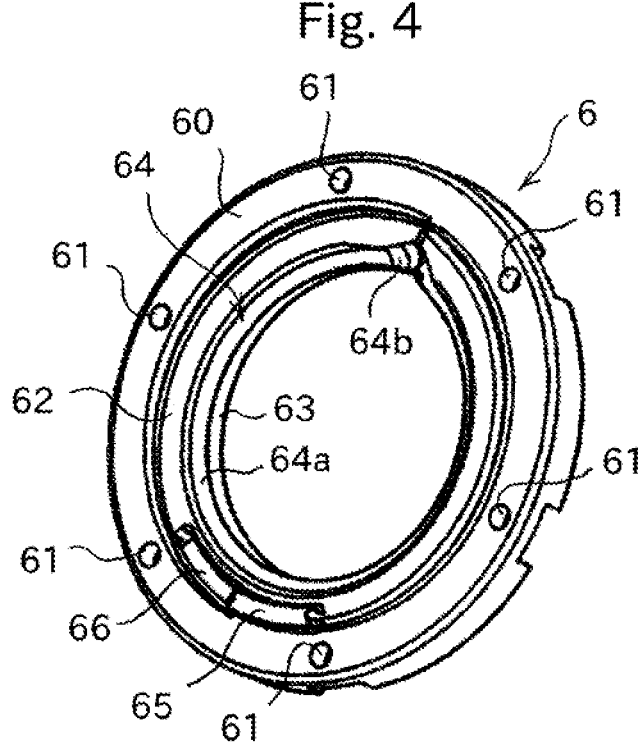
FIG. 4 is a perspective view for illustrating a second member forming the nut member.

FIG. 4 is a perspective view for illustrating the second member 6, and is an illustration of the second member 6 as viewed from the side of the joining surface with respect to the first member 5. The second member 6 has an abutment surface 60 for joining which is to be brought into abutment against the abutment surface 50 for joining of the first member 5. A plurality of insertion holes 61 configured to allow the fixing bolts to pass therethrough are formed in the abutment surface 60 for joining. Moreover, a raceway forming surface 62 which is to be brought into abutment against the raceway forming surface 53 of the first member 5 is formed on a radially inner side of the abutment surface 60 for joining. The raceway forming surface 62 is located between the abutment surface 60 for joining and an inner peripheral surface 63 of the through hole. That is, the raceway forming surface 62 is annularly formed around the through hole, and the abutment surface 60 for joining is formed on an outer side in a radial direction with respect to the raceway forming surface 62.

At a corner portion at which the raceway forming surface 62 and the inner peripheral surface 63 of the through hole intersect each other, a second ball circulation groove 64 forming the raceway path 30 is formed. The second ball circulation groove 64 includes, similarly to the first ball circulation groove 55 of the first member 5, a load groove portion 64a and a no-load groove portion 64b. The load groove portion 64a has a spiral shape having the same pitch as that of the rolling groove 20 of the screw shaft 2. The no-load groove portion 64b connects both ends of the load groove portion 64a to allow the balls 4 to circulate between the both ends of the load groove portion 64a.

When the abutment surface 50 for joining of the first member 5 is brought into abutment against the abutment surface 60 for joining of the second member 6, and the first member 5 and the second member 6 are integrated with each other with use of the fixing bolts, the first ball circulation groove 55 and the second ball circulation groove 64 are adjacent to each other along the axial direction of the screw shaft. Accordingly, in the nut member 3, the raceway path 30 is obtained. The balls are arranged in the raceway path 30. At a portion corresponding to the load groove portions 55a and 64a, the balls arranged between the screw shaft 2 and the nut member 3 roll around the screw shaft 2 in a spiral manner while bearing a load. Meanwhile, at a portion corresponding to the no-load groove portions 55b and 64b, the balls 4 climb over a thread portion of the screw shaft 2 and move between adjacent parts the rolling groove 20 on the screw shaft 2.

Figure 5:
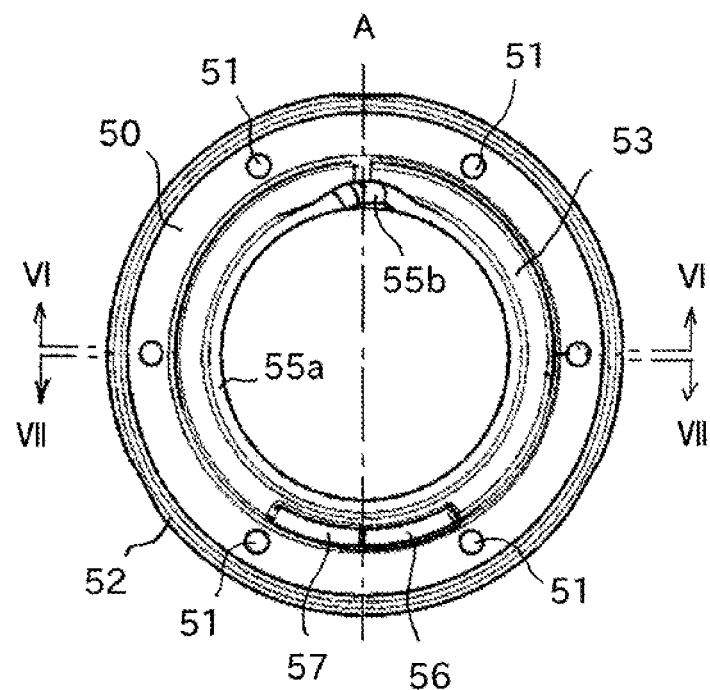
FIG. 5 is a front view for illustrating an abutment surface for joining and a raceway forming surface of the first member.
Figure 6:
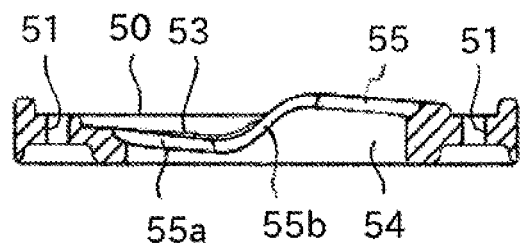
FIG. 6 is a sectional view taken along the line VI-VI of FIG. 5.
Figure 7:
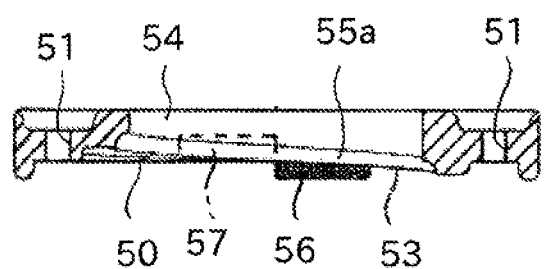
FIG. 7 is a sectional view taken along the line VII-VII of FIG. 5.

FIG. 5 is a front view for illustrating the first member 5, and is an illustration of the first member 5 as viewed from the joining surface side with the second member 6. Moreover, FIG. 6 and FIG. 7 are sectional views of the first member 5, in which FIG. 6 is a view seen from the direction indicated by the arrow VI-VI of FIG. 5, and FIG. 7 is a view seen from the direction indicated by the arrow VII-VII of FIG. 5. As illustrated in FIG. 6 and FIG. 7, the abutment surface 50 for joining of the first member 5 is formed as a flat surface perpendicular to the axial direction of the nut member 3.

The first ball circulation groove 55 is formed at the corner portion at which the raceway forming surface 53 and the inner peripheral surface 54 of the through hole intersect each other, and hence the raceway forming surface 53 has a curved-surface shape along the raceway shape of the first ball circulation groove 55, in other words, a curved-surface shape along the endless circulation path for the balls 4. Thus, at the portion corresponding to the load groove portion 55a of the first ball circulation groove 55, the raceway forming surface 53 has a spiral shape in conformity with the rolling groove 20 of the screw shaft 2. Moreover, at the portion corresponding to the no-load groove portion 55b of the first ball circulation groove 55, the raceway forming surface 53 is formed in such a manner as to cross the rolling groove 20 of the screw shaft 2.

Moreover, as is apparent from FIG. 6 and FIG. 7, the raceway forming surface 53 has such a shape that a half of the raceway forming surface 53 that surrounds the periphery of the screw shaft 2 projects toward the second member 6 side with respect to the abutment surface 50, and another half thereof is recessed with respect to the abutment surface 50. That is, the raceway forming surface 53 has such a shape that, when the raceway forming surface 53 is folded along a line segment A that passes through a center of the no-load groove portion 55b and a center of the through hole (which is indicated by one-dot chain line of FIG. 5), a right half and a left half of the drawing sheet of FIG. 5 are superposed without any gap. Although not shown, the raceway forming surface 62 of the second member 6 has the same shape as that of the raceway forming surface 53 of the first member 5.

Thus, when the abutment surface 60 for joining of the second member 6 is brought into abutment against the abutment surface 50 for joining of the first member 5, and the first member 5 and the second member 6 are integrated with each other, the raceway forming surface 53 of the first member 5 and the raceway forming surface 62 of the second member 6 are superposed on each other without any gap. Accordingly, the first ball circulation groove 55 and the second ball circulation groove 64 are combined with each other with high accuracy, and the raceway path 30 is obtained.

As illustrated in FIG. 5 and FIG. 7, a locking protrusion 56 configured to position the second member 6 with respect to the first member 5 is formed on the raceway forming surface 53 of the first member 5. The locking protrusion 56 projects toward the second member 6 side with respect to the abutment surface 50. Meanwhile, a locking hole 57 conforming to the size of the locking protrusion 56 is formed in the raceway forming surface 53 of the first member 5. The locking hole 57 is recessed with respect to the abutment surface 50. The locking protrusion 56 and the locking hole 57 are located at such positions as to form a mirror symmetry with respect to the line segment A of FIG. 5. Moreover, the raceway forming surface 62 of the second member 6 has a locking protrusion 65 and a locking hole 66, which are similar to the locking protrusion 56 and the locking hole 57 (see FIG. 4).

Thus, when the first member 5 and the second member 6 are combined with each other so that the raceway forming surface 53 of the first member 5 and the raceway forming surface 62 of the second member 6 are superposed on each other, the locking protrusion 56 of the first member 5 is fitted to the locking hole 66 of the second member, and the locking protrusion 65 of the second member 6 is fitted to the locking hole 57 of the first member 5. Accordingly, the first member 5 and the second member 6 can be positioned in a circumferential direction with high accuracy.

It is only required that the locking protrusion 56 and the locking hole 57 be located at such positions as to form a mirror symmetry with respect to the above-mentioned line segment A. When ease of processing of the locking protrusion 56 and the locking hole 57 is taken into consideration, it is preferred that the locking protrusion 56 and the locking hole 57 be located on opposite sides across the no-load groove portion 55b and a center of the axis so as to be adjacent to each other as illustrated in FIG. 5.

According to the ball screw device 1 of this embodiment having the configuration described above, the raceway path 30 for the balls 4 to be formed in the nut member 3 is divided in half at the joining surface between the first member 5 and the second member 6. Thus, the nut member can easily be produced by forming the first member and the second member by forging with dies and combining the first member and the second member with each other.

Moreover, the raceway forming surface 53 of the first member 5 and the raceway forming surface 62 of the second member 6 have the same shape, and hence a part of the dies can be used in common when the forging is performed on the first member 5 and the second member 6. In view of this, ease of production and assembly and reduction in production cost for the nut member 3 can be achieved.

Further, the first ball circulation groove 55 included in the raceway forming surface 53 of the first member 5 and the second ball circulation groove 64 included in the raceway forming surface 62 of the second member 6 have the same shape, and hence, when the first member 5 and the second member 6 are combined with each other, the endless circulation path for the balls can be formed with high accuracy, with this, the screw shaft 2 can perform a translational motion in accordance with a rotary motion of the nut member 3, or the nut member 3 can perform a translational motion in accordance with a rotary motion of the screw shaft 2 with high accuracy.

In the embodiment described above with reference to the drawings, the nut member 3 is formed of the pair of nut components, that, is, the combination of the first member 5 and the second member 6, and only one circuit of the endless circulation path for the balls 4 is present in the joining surface between the first member 5 and the second member 6. However, there may be provided a third member as a nut component to be interposed between the first member 5 and the second member 6, and raceway forming surfaces having the same shape as those of the raceway forming surface 53 of the first member 5 and the raceway forming surface 62 of the second member 6 may be formed on both front and back surfaces of the third member. With such a change in design, the endless circulation path for the balls can be formed in the joining surface between the first member 5 and the third member and in the joining surface between the third member and the second member 6. Accordingly, a plurality of circuits of the endless circulation path can easily be formed in the nut member 3 by increasing the number of third members to be interposed between the first member 5 and the second member 6.

Moreover, in the embodiment described above with reference to the drawings, the rib 52 is formed on the radially outer side of the abutment surface 50 for joining of the first member. However, the rib 52 may be omitted as appropriate depending on a shape of the abutment surface 50 for joining. That is, in the present invention, as long as the plurality of nut components each have the raceway forming surface of the same shape, a shape of the nut components on the outer side in the radial direction with respect to the raceway forming surface can be changed in design as appropriate in consideration of the joining of the plurality of nut components.

The invention claimed is:

1. A ball screw device, comprising:
a plurality of balls;
a screw shaft having a spiral rolling groove in an outer peripheral surface thereof, the spiral rolling groove being configured to allow the plurality of balls to roll therein; and
a nut member which is threadedly engaged with the screw shaft through intermediation of the plurality of balls,
wherein the nut member includes a plurality of nut components each having a through hole configured to allow the screw shaft to be inserted therethrough, the plurality of nut components being arranged in a superposed manner along an axial direction of the screw shaft,
wherein, at a boundary portion between the plurality of nut components which are adjacent to each other along the axial direction of the screw shaft, a raceway path extending around a periphery of the screw shaft is formed as an endless circulation path for the plurality of balls,
wherein the plurality of nut components each have a joining surface each including:
a raceway forming surface which is annularly formed around the through hole; and
an abutment surface which is formed on a radially outer side of the raceway forming surface, and configured to join with another one of the plurality of nut components,
wherein the raceway forming surface has a curved-surface shape along the raceway path, and the abutment surface for joining is formed as a flat surface perpendicular to the axial direction of the screw shaft,
wherein the raceway forming surfaces formed on the plurality of nut components have the same shape,
wherein the raceway forming surface has such a shape that a half of the raceway forming surface that surrounds the periphery of the screw shaft projects with respect to the abutment surface, and another half thereof is recessed with respect to the abutment surface,
wherein the plurality of nut components each have a ball circulation groove, which is formed at a corner portion at which the raceway forming surface and an inner peripheral surface of the through hole intersect each other,
wherein the ball circulation groove includes:
a load groove portion configured to allow the plurality of balls to roll between the screw shaft and the load groove portion while bearing a load; and
a no-load groove portion connecting both ends of the load groove portion, and
wherein the raceway forming surfaces of the plurality of nut components which are adjacent to each other are superposed on each another to allow the ball circulation grooves to form the raceway path.

2. The ball screw device according to claim 1, wherein the raceway forming surface has such a shape that, when the raceway forming surface is folded along a hypothetical line segment that passes through a center of the no-load groove portion and a center of the through hole, a right half and a left half of the raceway forming surface across the hypothetical line segment are superposed without any gap.

3. The ball screw device according to claim 1, wherein the raceway forming surfaces of the plurality of nut components each have a locking protrusion and a locking hole, and the raceway forming surfaces of the plurality of nut components which are adjacent to each other are superposed on each other to allow the locking protrusion of one nut component to be fitted to the locking hole of another nut component.

* * * * *